United States Patent
Seul et al.

(10) Patent No.: US 9,680,809 B2
(45) Date of Patent: Jun. 13, 2017

(54) SECURE DATA STORAGE ON A CLOUD ENVIRONMENT

(71) Applicant: International Business Machines Corporation, Armonk, NY (US)

(72) Inventors: Matthias Seul, Kassel (DE); Artemiy A. Solyakov, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 14/880,455

(22) Filed: Oct. 12, 2015

(65) Prior Publication Data

US 2017/0104736 A1    Apr. 13, 2017

(51) Int. Cl.
| | |
|---|---|
| H04L 29/06 | (2006.01) |
| G06F 17/30 | (2006.01) |
| G06F 21/62 | (2013.01) |
| H04L 29/08 | (2006.01) |
| H04L 9/08 | (2006.01) |

(52) U.S. Cl.
CPC ...... *H04L 63/062* (2013.01); *G06F 17/30091* (2013.01); *G06F 21/6218* (2013.01); *H04L 9/085* (2013.01); *H04L 63/061* (2013.01); *H04L 67/1097* (2013.01); *G06F 2221/2107* (2013.01)

(58) Field of Classification Search
CPC ....... G06F 2221/2107; G06F 17/30194; H04L 67/1097; H04L 9/085
See application file for complete search history.

(56) References Cited

U.S. PATENT DOCUMENTS

| | | | |
|---|---|---|---|
| 7,894,599 B2 | 2/2011 | Rigler | |
| 9,432,188 B2* | 8/2016 | Chida | G06F 21/606 |
| 2002/0129242 A1* | 9/2002 | Abbott | H04L 9/0894 |
| | | | 713/157 |
| 2004/0111608 A1* | 6/2004 | Oom Temudo de Castro | G06F 21/40 |
| | | | 713/156 |
| 2007/0174635 A1* | 7/2007 | Jones | G06F 21/125 |
| | | | 713/189 |
| 2012/0166745 A1 | 6/2012 | Retnamma et al. | |
| 2013/0013931 A1* | 1/2013 | O'Hare | G06F 21/62 |
| | | | 713/189 |
| 2013/0138619 A1 | 5/2013 | Krislov | |
| 2014/0006354 A1* | 1/2014 | Parkison | G06F 17/30194 |
| | | | 707/649 |
| 2014/0196124 A1 | 7/2014 | Wang et al. | |

(Continued)

*Primary Examiner* — James Turchen
(74) *Attorney, Agent, or Firm* — Steven F. McDaniel

(57) ABSTRACT

A method for secure data storage in a cloud storage infrastructure comprises providing a set of first upload files to be stored in the cloud storage infrastructure, providing a set of first random noise files, splitting each file of the two sets into a group of fragments, recombining the fragments by randomly intermixing fragments from different groups thus generating a set of second upload files, encrypting each second upload file with a first encryption key and storing each first encryption key in a secure storage location, storing reconstruction information about the set of first upload files, the splitting, the recombining and the first encryption keys in the secure storage location, uploading each second upload file to a respective temporary cloud storage location, repeatedly moving each uploaded second upload file to a new temporary cloud storage location in predetermined intervals of time.

16 Claims, 12 Drawing Sheets

(56) References Cited

U.S. PATENT DOCUMENTS

| | | | |
|---|---|---|---|
| 2014/0201541 A1* | 7/2014 | Paul | G06F 21/6245 |
| | | | 713/193 |
| 2014/0281520 A1* | 9/2014 | Selgas | G06F 21/6209 |
| | | | 713/165 |
| 2015/0310219 A1* | 10/2015 | Haager | G06F 21/602 |
| | | | 713/165 |
| 2015/0381736 A1* | 12/2015 | Seltzer | H04L 67/1097 |
| | | | 709/203 |
| 2016/0292429 A1* | 10/2016 | Manville | G06F 21/602 |

* cited by examiner

SECURE DATA STORAGE ON A CLOUD ENVIRONMENT

BACKGROUND

The present invention relates to a computer-implemented method for secure data storage in a cloud storage infrastructure comprising a plurality of cloud storage locations and a computer system for secure data storage in a cloud storage infrastructure. The invention further relates to a computer-implemented method for reconstructing data stored in a cloud storage infrastructure comprising a plurality of cloud storage locations.

SUMMARY

The present invention provides for a computer-implemented method and a computer system for secure data storage in a cloud storage infrastructure comprising a plurality of cloud storage locations as specified in the independent claims. The invention further provides for a computer-implemented method for reconstructing data stored in a cloud storage infrastructure comprising a plurality of cloud storage locations. Further embodiments of the invention are given in the dependent claims. Embodiments of the present invention can be freely combined with each other if they are not mutually exclusive.

In one aspect, the invention relates to a computer-implemented method for secure data storage in a cloud storage infrastructure comprising a plurality of cloud storage locations, the method comprising providing a set of first upload files to be stored in the cloud storage infrastructure, providing a set of first random noise files, splitting each file of the two sets into a group of fragments, recombining the fragments by randomly intermixing fragments from different groups thus generating a set of second upload files, each second upload file comprising fragments from different files of the two sets, encrypting each second upload file with a first encryption key and storing each first encryption key in a secure storage location, storing reconstruction information about the set of first upload files, the splitting, the recombining and the first encryption keys in the secure storage location, the reconstruction information being sufficient to reconstruct the first upload files from the set of second upload files using the first encryption keys, uploading each second upload file to a respective temporary cloud storage location, the respective temporary cloud storage location for each second upload file being determined from a plurality of available cloud storage locations according to a first upload distribution, and repeatedly moving each uploaded second upload file to a new temporary cloud storage location in predetermined intervals of time in order to store each second upload file in each determined cloud storage location only for a limited period of time.

In a further aspect, the invention relates to a computer-implemented method for reconstructing data stored in a cloud storage infrastructure comprising a plurality of cloud storage locations, the method further comprising retrieving reconstruction information and first encryption keys, determining a set of second upload files comprising all fragments of a set of first upload files to be reconstructed using the reconstruction information, downloading the second upload files from their temporary cloud storage locations, decrypting the downloaded second upload files using the first encryption keys, splitting the decrypted files into the fragments of the first upload files and random noise fragments using the reconstruction information, and selecting the fragments of the first upload files and reconstructing the first upload files by recombining the respective fragments using the reconstruction information.

In a further aspect, the invention relates to a computer system for secure data storage in a cloud storage infrastructure, the computer system comprising a memory for storing machine executable instructions and a processor for executing the machine executable instructions, execution of the machine executable instructions by the processor causing the processor to execute a method comprising providing a set of first upload files to be stored in the cloud storage infrastructure, providing a set of first random noise files, splitting each file of the two sets into a group of fragments, recombining the fragments by randomly intermixing fragments from different groups thus generating a set of second upload files, each second upload file comprising fragments from different files of the two sets, encrypting each second upload file with a first encryption key and storing each first encryption key in a secure storage location, storing reconstruction information about the set of first upload files, the splitting, the recombining and the first encryption keys in the secure storage location, the reconstruction information being sufficient to reconstruct the first upload files from the set of second upload files using the first encryption keys, uploading each second upload file to a respective temporary cloud storage location, the respective temporary cloud storage location for each second upload file being determined from a plurality of available cloud storage locations according to a first upload distribution, and repeatedly moving each uploaded second upload file to a new temporary cloud storage location in predetermined intervals of time in order to store each second upload file in each determined cloud storage location only for a limited period of time.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
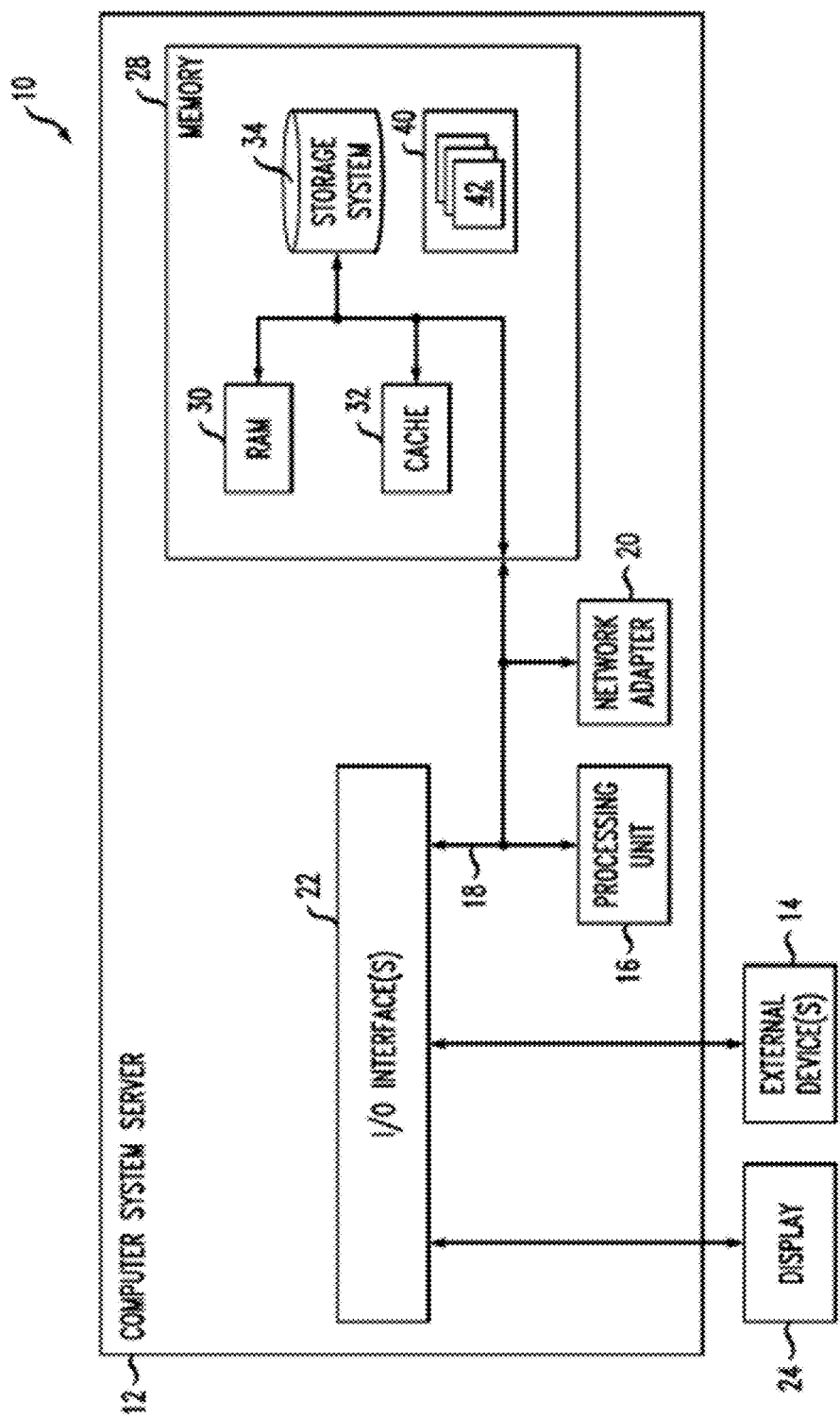
FIG. 1 depicts a schematic diagram illustrating an exemplary cloud computing node according to an embodiment.

The present invention may also include the following example features:

Modern cloud storage systems face the common dilemma, either data files have to be handed over to a third-party and thus control over data security has at least partially been given up or one has to refrained from using cloud storage services in order to keep full control over data security. A third option may be private cloud storage hosting, e.g. by using a suite of client-server software for creating one's own file hosting services. However, such an approach defeats the whole purpose of on-demand file storage, i.e. outsource the management of the required IT infrastructure.

In order to take advantage of on-demand file storage, one has to rely on third-party services which means giving up the control over the transferred files, e.g. in view of the potentially risks that data may be read by an unauthorized party and misused.

Commonly available encryptions may not be able to provide a one-hundred percent protection against unauthorized access. Thus, it may be assumed that simply encrypting files before or during upload is not enough to secure them, if the data transfer is eavesdropped or the cloud storage compromised.

When storing data in a cloud storage several security issues may occur: the data transfer with the cloud may be eavesdropped, the cloud storage may be read or appropriated by third-parties. Some cloud service providers apply encryption to the data stored in their systems. However, in that case also the encryption keys are managed by the cloud service providers and usually stored in their systems. Furthermore, it lies in the hands of the cloud service providers which encryption is used and which security levels are applied.

Thus, cloud storage is a matter of trust. However, once the data is stored in the cloud the user's control over the data is limited. Do-it-yourself 'cloud storage' solutions, wherein the user provides and uses his own servers to provide cloud services removes most of the positive aspects of cloud solutions provided by third party cloud service providers.

Pure encryption solutions rely on the assumption that not having the encryption key provides enough protection. Standard encryption approaches are based on a one-factor-authentication data protection, as soon as one comes into possession of the key or manages to break the encryption full access to all the encrypted data is provided.

The present invention suggests a multi-factor-authentication data protection approach. In order to gain access to the data not only encryption key(s) have to be known, but also the location(s) and structure(s) of a given file have to be known.

The invention introduces a method by which files are split, intermixed, encrypted, and kept in motion according to a unique pattern.

Thus, an attacker may not get a hold of the data even if the encryption key(s) has been procured. Furthermore, the proposed solution may allow secure storing of data even if all the cloud storage services used are compromised, e.g. by monitoring of third parties. The storing entity on the other hand may be provided with easy access to the files, since it knows the correct location(s), data structure(s) and encryption key(s).

An embodiment of a suitable environment may for example be configured as a secure storage service module to be deployed inside the network of a company. The secure storage service module may offer a secure storage service to be accesses by individual network members to upload and retrieve files in the cloud. The cloud storage services and systems may no longer be accesses directly, but instead via the secure service module acting as an intermediary.

The method may thwart attackers' attempts at gaining access to protected files through multiple layers of obfuscation and encryption.

According to embodiments, the files to be stored and a set of random noise data may be encrypted with a unique key for each file. The keys are stored in a secure storage location.

Before a file is uploaded, according to embodiments, it may be checked for other files also pending for transfer. The total amount of data to be transferred may be determined and a plurality of obfuscated files created by intermixing the files to be stored and the set of random noise. After being newly assembled, each obfuscated files may contain fragments of different original files in addition to random noise.

A manifest file comprising reconstruction information may be stored at a secure storage location recording which obfuscated file contains which file parts for later reassembly of the original files.

According to embodiments, all cloud storage locations, i.e. cloud storage service providers and accounts, may be taken into account. The obfuscated files of a given transaction may be distributed across a plurality of different cloud storage providers and accounts. Thus, different parts of an original file may end up being uploaded to different providers and/or accounts. Thereby, it may be ensured that no single cloud storage service provider receives all files of a transaction and in particular not all fragments of an original file. This approach makes it harder for an attacker to get a complete file by attacking a single provider.

Assuming that an attacker may compromise any and all cloud storage providers, it may be possible that all of the previously decrypted layers may be rendered useless by simply monitoring uploads and accesses to figure out which files make up a transaction, collect them and execute a reverse engineering attack.

According to embodiments, even such an all-seeing attacker may be denied the ability to discern which files make up a single transaction, i.e. set of original files, and also where these obfuscated files are actually located by the following measures: Obfuscation of size and file members of transaction: The obfuscated filing process may be re-iterated with different sets of noise, thus creating multiple obfuscated files that contain the same fragments of the original files but different noise content and a different arrangement of fragments inside the obfuscated file. To an outside attacker each created obfuscated file therefore looks different although it may contain the same data. The present method may use this approach to create multiple copies of the same data content that may not easily be detected from the outside. In other words, thus the actual amount and size of the data content of the transaction may be obfuscated. An attacker, when monitoring uploads and accesses, may thus be forced to collect too much or too little data and fail to reconstruct a valid encryption container that may be attacked using brute-force approaches.

According to embodiments, an algorithm may be featured that, e.g. taking in a checksum, passphrase, randomly generated number or the like for the transaction as a seed, may generate a potentially endless sequence of nodes within the structure of available cloud storage locations provided by the cloud storage infrastructure which the file may traverse. Each element of this sequence may comprise a specification of a cloud storage node, a generated file name for the obfuscated file, when being stored at the node, and a time-to-live, e.g. in seconds, indicating how long the obfuscated file is to be stored at the node. When the time-to-live for an obfuscated file has expired, it may automatically be moved to one or more other nodes of the structure determined by a querying the algorithm. To do so, the present method may download the obfuscated file and transfer it to the new node.

In order to further improve the security, not all of the available nodes may be chosen, i.e. be provided with an obfuscated file created from the same set of original files. For example a maximum of 50% of the available nodes may actually receive files comprising fragments of the original files, while the remaining 50% may either receive no file or a file made up of just random noise.

Furthermore, according to embodiments, after downloading the downloaded files at the nodes may either be overwritten with new files of other uploads that are pending relocation or with random noise files or a deletion command may be issued for deleting the file after download.

The attempt outlined above may be repeated as long as the file is to be kept on the cloud storage, therein keeping all files in constant flux between different cloud storage locations. Thus, a lifecycle is created for a file that has multiple potential future locations that may or may not become true, i.e. the file may or may not be uploaded to them at a specific time. Whenever the file is moved, more possible future locations are introduced with more and more locations being taking up by dud obfuscated files or obfuscated files that belong to a different transaction. Cloud storage locations may also be re-use. Thus, after a short time the combinations of possible locations may become complex enough that an attacker trying to gain knowledge about the data comprised by the original files may be required to do massive-scale brute-force combination of files and encryption-breaking in addition to being able to compromise all used cloud storage providers.

In order to re-assemble a given file, the pre-seed randomizer may be fed with a seed and the upload time of the respective file at which it has been uploaded. Based on the provided seed and upload time, the randomizer may generate a sequence identifying where the files to which the seed has been assigned is currently located. Furthermore, all possible futures that may become true for a file may be checked.

To speed up the process of collecting the files for the re-assembling, the solution may skip a plurality, e.g. 60-80%, of the storage locations known unused, re-used by files of a other transactions or filled with dud files. Furthermore, this partial skipping my make it harder for an outside attacker to guess which files belong to a transaction by looking at which parts are requested after storage.

According to embodiments, the present method may for example be implemented as a storage service that interfaces with outside cloud storage providers. In this regard, the storage service may be proprietary software emulating a file system or common storage protocols such as WebDAV, SMB or FTP. This storage service may be implemented using a new hardware device or as a software service added to an existing server, e.g. by using a computer program product.

The security of the present method may further be improved by splitting up the information required for locating, decrypting and reconstructing files between different instances of the storage service implementation requiring access to all instances to assemble a single file. This may prevent an attacker from gaining access to the respective information, in particular the valuable seeds, by compromising single instances of the computer system(s) used for implementing the present method.

Thus, features of the present invention may have the beneficial effect that none of the cloud storage location is provided with a set of files sufficient for reconstructing one of the first upload files, i.e. original files, in case the encryption could be broken. Due to the splitting and random recombination of the resulting fragments of the set of first upload files, the same are obfuscated such that on the one hand a plurality of second upload files is required in order to reconstruct even a single first upload file. On the other hand, even in case all the second upload files could be obtained, due to the random combination comprising random noise fragments which are not part of the set of first upload files, it may be difficult to identify which fragments belong to the set of first upload files and how the same have to be combined such that the original files may be reconstructed.

Transferring distinguishable parts of a given data file could make the cloud storing vulnerable to an attacker who is able to gain either access to the storage infrastructure used or to the communication connection to and/or from the storage infrastructure. Knowledgeable attacker may in particular be allowed to siphon-off data files as they are uploaded to or downloaded from the cloud storage by a user.

The present method may deal with this issue by intermixing different files during upload and introducing random noise fragments. This 'noise' prevents an attacker to derive the contents of a given block, even after encryption, by looking for specific patterns generated by the contents. This also allows homogenizing the size of the obfuscated files to be uploaded and in turn allows making each obfuscated file virtually indistinguishable.

The information required to unlock the puzzle generated by the present method, i.e. the reconstruction information, is not part of the transferred data. It is rather stored in a secure storage, i.e. a separate storage with a high security level and restricted access rights. According to embodiments, the reconstruction information may be stored on one or more decentralized storages. If the information is in contrary stored in a central location, an attacker could try to attack said central location to get info on all of the currently active data files.

The present method instead of recording the location of each file set comprises an algorithm in place, provided by the pre seed-randomizer which may also be configured as an intermixer, that is fed with a seed consisting of meta-data on the original file(s), available storage nodes, the current time and requested action. Based on this seed the algorithm may produce a non-random intermix plan or identify the locations for a given file set on the provided storage nodes at the given point in time, i.e. the current time/upload time. The advantage is that while the logic to generate the outputs is in the algorithm, the seed is crucial to get the right result out of the algorithm. Thus, the user is enabled to separate the seed from the algorithm, i.e. pre-seed randomizer, thus raising the level of security provided by the present method.

According to embodiments, the set of first upload files comprises at least one first upload file. According to embodiments, the set of first upload files comprises a plurality of first upload files. According to embodiments, the set of first random noise files comprises at least one first random noise file. According to embodiments, the set of first random noise files comprises a plurality of first random noise files. According to embodiments, each second upload file comprises fragments from different files of the set of first upload files and at least one fragment of the set of first random noise files. According to embodiments, each second upload files comprises at least one fragment of each first upload file. According to an embodiment only a subset of second upload files comprises at least one fragment from each first upload file. According to embodiments, none of the second upload files comprises a fragment from each first upload file, but only fragments from a subset of the set of first upload files. According to embodiments, each time a set of first upload files is split into fragments and recombined into a set of second upload files, it is randomly decided whether one or more of the resulting second upload files comprise fragments from all of the first upload files.

According to embodiments, the intermixing, i.e. splitting and recombining, may be handled by the pre-seed randomizer which is also configured as an intermixer. According to embodiments, a separate intermixer comprising a second pre-seed randomizer is provided for intermixing and reconstructing of files.

Encrypting second upload files may have the beneficial effect that, when trying to obtain a sufficient set of files for reconstruction by a third party from the temporary cloud storage locations or by monitoring the downloads and/or uploads from and/or to the temporary cloud storage locations, all files have to be decrypted, e.g. by time consuming brute force attempts, in order to be able to decide whether the obtained files are sufficient to reconstruct at least one first upload file.

According to embodiments, the reconstruction information may be stored at one secure storage location or be distributed over a plurality of secure storage locations. Since the size of the reconstruction information may in general be significantly smaller than the size of the set of first upload files, the reconstruction information may be stored on a local storage of the uploading computer system or on a separate storage device at least temporarily connectable with the uploading computer system. The reconstruction information may be small, since it may for example only comprise intermixing seeds, first upload file IDs, and first encryption key IDs. Further structural details of the splitting, recombining may be provided by a pre-seed randomizer, when being provided with an intermixing seed.

According to embodiments, the reconstruction information may not only comprise information regarding the construction of the second upload files/reconstruction of the first upload files, but also information regarding the uploading/moving of the respective second upload files. According to embodiments, the uploading and moving may be performed independently of the reconstruction information regarding the file construction. According to embodiments, the reconstruction information regarding the first upload file construction may be stored on a separate device, which is only connected with the uploading computer system, in case new files are to be recombined for upload or the set of first upload files is to be reconstructed from the uploaded files. According to embodiments, an authentication may be required in order to access secure storage locations.

By repeatedly moving each uploaded file from one temporary cloud storage location to another cloud storage location at predetermined intervals of time, it may become difficult for a third party to determine on which cloud storage location which file is stored.

According to embodiments, the present method is successively provided to a plurality of sets of first upload files. Thus, due to the repeated moving all the second upload files originating from all the sets of first upload files, it becomes challenging to determine for an individual second upload file on an individual cloud storage location to which set of first upload files the respective file may belong.

For determining a temporary cloud storage location, a pre-seed randomizer may be used. The pre-seed randomizer may be a software and/or hardware based module provided configured for randomly determine a temporary cloud storage location using a first seed assigned to the second upload file to be uploaded and an upload time at which the file is to be uploaded or has been uploaded. Being provided with the identical seed and the identical time, the pre-seed randomizer may always present the same result. Being provided with a different time or a different seed, the pre-seed randomizer may randomly determine a different cloud storage location. According to embodiments, the pre-seed randomizer may be an algorithm which selects a temporary cloud storage location from a list or a pattern of available cloud storage locations. The result of the pre-seed randomizer may depend on the structure of the list or pattern of available cloud storage locations. A cloud storage location may be given by a certain account provided by a certain cloud storage location service provider. This may have the further beneficial effect that in order to determine the correct cloud storage location, not only the pre-seed randomizer respective first seed has to be known but that also structure of the list and/or pattern of the cloud storage locations. This may further increase the security level of the present method.

According to embodiments, the generation of the set of second upload files may be performed independently of the uploading and moving of the uploaded files. According to embodiments, the generation of the set of second upload files may be performed on a separate computer system independent of the computer system used for uploading and moving of the uploaded files. The set of first upload files may be provided to the independent upload computer system by a third independent computer system. According to embodiments, both procedures, i.e. the generation of the set of second upload files and the uploading and moving of the uploaded files, may be performed by the same computer system.

According to embodiments, the method further comprises providing the first upload distribution by a pre-seed randomizer, the pre-seed randomizer uses a first seed assigned to the respective second upload file and an upload time for randomly determining the respective temporary cloud storage location of the respective second upload file according to the first upload distribution, and storing the first seeds in the secure storage location.

According to embodiments, the method further comprises moving each uploaded second upload file by downloading the respective file from its respective temporary cloud storage location, the respective temporary cloud storage location being identified using the pre-seed randomizer, the first seed assigned to the respective file and the latest upload time of the respective file, and performing a new upload of the respective file to a new temporary cloud storage location, the new temporary cloud storage location being determined using the pre-seed randomizer, the first seed assigned to the respective file and a new upload time for the new upload of the respective file.

According to embodiments, the upload times of the latest uploads of each second upload file are stored and may be retrieved from the storage for downloading the respective second files. According to embodiments, each time a new upload of a second upload file is performed, the stored upload time is replaced by the new upload time such that the respective storage for each second file only comprises the latest upload file. According to embodiments, the second upload files are uploaded at predefined intervals of time. In this case, the upload time of a file used for uploading the respective file is given by a time assigned to the interval of time at which the respective file is uploaded, e.g. the starting time of the interval, while the latest upload time used for downloading a file is given by the upload time assigned to the interval of time at which the respective file has been uploaded, i.e. either the current interval of time or the previous interval of time. The latest upload time may be given by the upload time assigned to the current interval, if the respective file is to be downloaded at a non predetermined time, i.e. even though the respective predetermined interval of time of the latest upload has not ended yet.

According to embodiments, the method further comprising in response to downloading a second upload file from its temporary cloud storage location sending a delete command triggering a deletion of the respective file from the respective temporary cloud storage location.

This may have the beneficial effect that the data amount stored in the cloud is prevented from excessively growing and on the other hand it may be ensured that no cloud storage location may comprise all files necessary for reconstructing the first upload files even after large number of moving procedures.

According to embodiments, the set of first upload files is the result of encrypting a set of upload files, each file of the set of upload files being encrypted with a second encryption key which is stored the a secure storage location, and the set of first random noise files being the result of encrypting a set of random noise files, each file of the set of random noise files being encrypted with a second encryption key which is stored in the secure storage location.

Said features may have the beneficial effect that an identification and recombination of the fragments of the set of first upload files may become more challenging, even in case the encryption of the set of second upload files may be broken. Due to the fact that all fragments are fragments of encrypted files, it is even more difficult to identify fragments and to identify to which files these fragments may belong. Furthermore, the encryption of first upload files may hardly be broken without being provided with the complete file. However, without breaking the encryption one may not be able to combine the fragments in the right way in order to obtain the complete file.

According to embodiments, the first upload files and the first random noise files are split and recombined such that the resulting second upload files have equal sizes.

This may have the beneficial effect that no information about the files may be obtained from their size. Thus, it may be harder to distinguish and identify the structural relationship of a given second upload file to the set of first upload files.

According to embodiments, the first upload files and the first random noise files are split and recombined such that the resulting second upload files have random sizes.

This may have the beneficial effect that due to the randomization of the size of the second upload files no information about the files may be derived from their size.

According to embodiments, the secure storage location in which the first encryption keys and reconstruction information are stored is configured as a distributed storage structure with storage segments distributed on different storage systems, each storage system having access authentication requirements which are independent of the access authentication requirements of the other storage systems.

This may have the beneficial effect that for a third party it becomes more challenging to gain access to all the information and keys in the distributed storage segments required to reconstruct the set of first upload files even in case the respective third party has obtained access to the second upload files. Thus, being authorized to access one of the storage systems does not include authorization to access any of the other storage systems. For each storage system there are independent access authorization requirements to be satisfied individually, for example each system may have independent superuser accounts being independent from the superuser accounts of the other systems. Thus, it may be prevented that an attacker, due to having gained access to one of the storage systems, may automatically have access to another one of the storage systems. A user may rather have to authorize independently for each of the storage systems in order to gain access to all of them. In order to gain access to all the storages segments building the distributed storage structure, a user may have to satisfy different access authentication requirements for each storage system.

According to embodiments, the method further comprises using different predetermined intervals of time for different second upload files.

This may have the beneficial effect that the different second upload files are moved at different times and the computational load required for the moving may be distributed over time avoiding overloads of the system and/or the data connections with the cloud. Furthermore, this may have the beneficial effect that from the time of moving no information about the relation of the moved files to one another may be derived.

According to embodiments, the method further comprises varying the length of the predetermined intervals over time.

This may have the beneficial effect that it may prevented a third party to be able to draw conclusions about the correlation of files based on the time of moving of a given uploaded file.

According to embodiments, the method further comprises determining the temporary cloud storage locations from a plurality of available cloud storage locations provided by different computer systems, each computer system having access authentication requirements which are independent of the access authentication requirements of the other computer systems.

This may have the beneficial effect that for a third party it becomes difficult to gain access to all the files of the second set of files required for reconstructing the first upload files even in case the third party may gain access to a single cloud system providing temporary cloud storage locations for the upload files.

According to embodiments, the method further comprises adding additional files to the set of second upload files.

This may have the beneficial effect that for a third party it becomes difficult to identify which uploaded files are really necessary for reconstructing the set of first upload files.

According to embodiments, the number of upload files is at least 50% larger than the minimum number of files comprising all fragments necessary for reconstructing the set of first upload files. Thus, a third party may have to identify the location of all uploaded files and obtain all of these files in order to be sure that no file which may potentially be necessary for reconstructing the set of first upload files is missed.

According to embodiments, the additional files are generated according to a method comprising providing a set of second random noise files, splitting first upload files and the second random noise files into groups of fragments, recombining the fragments by randomly intermixing fragments from different groups thus generating the additional files, each additional file comprising a unique combination of fragments with fragments from different files of the first upload files and second random noise files, encrypting each additional file with first encryption keys and storing the first encryption keys in the secure storage location, and storing reconstruction information about the first upload files, the splitting, the recombination and the first encryption keys in the secure storage location, the reconstruction information being sufficient to reconstruct the first upload files from the additional files using the first encryption keys.

This may have the beneficial effect that a third party, in order to obtain the set of first upload files may have to make more effort to obtain and analyze more files than actually necessary for the reconstruction due to lack of knowledge which files are actually sufficient for the reconstruction. Even though the files resulting from the repeated splitting and recombining may comprise redundant information, due to the different combinations and the different fragments of random noise which are integrated in the newly generated files, those redundancies may hardly be identified.

Furthermore, this may have the beneficial effect that for reconstructing first upload files, due to the redundancies it may be sufficient to only download part of the uploaded files, thereby for a third party observer it may be difficult to decide whether a download of a plurality of files is only due to a partial moving of the uploaded files or due to an actual complete reconstruction of the set of first upload files. This may in particular be the case, when the files used for a reconstruction are automatically uploaded again to new temporary cloud storage locations. This automatic re-upload may have the beneficial effect that on the one hand it is hard to decide whether a download is only due to a moving of the data or due to an actual reconstruction of files and on the other hand the files are thus kept stored in the cloud infrastructure even after usage.

According to embodiments, the additional files comprise dud files only comprising random noise.

This may have the beneficial effect that even though all files may be obtained, it is hard to decide whether a given file actually comprises any fragment necessary for the reconstruction or whether it may only be a file consisting of pure random noise. In order to fake the general structure of the files containing actual information as good as possible, the dud files may be generated by providing a set of random noise files, encrypting each of the files, splitting each file into a group of fragments, combining the groups of fragments randomly and encrypting the resulting file. Thus, the present method may introduce multiple copies of the set of first upload files, sometimes with different intermixing, alongside dud file only comprising random noise.

According to embodiments, the method further comprises in case the storage time of a dud file at a temporary cloud storage location exceeds a predefined threshold, sending a delete command triggering a deletion of the dud file from the respective temporary cloud storage location.

This may have the beneficial effect that the data amount stored in the cloud is kept limited and that the processing resources necessary for the moving are kept limited even though the number of upload files exceeds the number of files actually necessary for the reconstruction of the set of first upload files. A record of nodes filled with dud data, i.e. file made up of just random noise or non-confidential fake data, may be kept. These dud data files may be deleted after a set time, e.g. number of hours, to prevent the cloud storage from being swamped with bogus files. In order to make it harder for an attacker to discriminate dud data files from real data files, the dud data files may be downloaded before deleting.

According to embodiments, also in case the storage time of a file comprising only redundant fragments of the set of first upload files into a temporary cloud storage location exceeds a predefined threshold, sending a delete command triggering the deletion of the respective file from the respective temporary cloud storage location.

According to embodiments, in response to initiating a download of a file from a temporary cloud storage location which is not stored at the respective temporary cloud storage location a dud file is received comprising only random noise.

This may have the beneficial effect that it is not possible to determine the actual temporary storage location of a file using a trial and error approach.

In a further aspect, the invention relates to a computer-implemented method for reconstructing data stored in a cloud storage infrastructure comprising a plurality of cloud storage locations. This may have the beneficial effect that it allows reconstructing the set of first upload files, whenever the respective files are required.

According to embodiments, the method further comprises for reconstructing the first upload files downloading more second upload files than comprised by the set of second upload files necessary for reconstructing the set of first upload files.

This may have the beneficial effect that even for a third party observing the download activities it is hard to identify which of the download files are actually necessary for a reconstruction of the set of first upload files.

According to embodiments, the method further comprises retrieving second encryption keys and decrypting the reconstructed first upload files using the second encryption keys.

According to embodiments, to store again the reconstructed set of first upload files in the cloud infrastructure the method further comprises generating a set of third upload files by repeating the splitting, recombining, and encrypting of the reconstructed set of first upload files with a set of third random noise files and third encryption keys, storing second reconstruction information and each third encryption key in a secure storage location, the second reconstruction information being sufficient to reconstruct the first upload files from the third upload files using the third encryption keys, uploading each third upload file to a respective temporary cloud storage location, the respective temporary cloud storage location for each third upload file being determined from a plurality of available cloud storage locations according a second upload distribution, and repeatedly moving each uploaded third upload file to a new temporary cloud storage location in predetermined intervals of time in order to store each third upload file in each determined cloud storage location only for a limited period of time.

The method may thus initiate a 'stirring' of the files by re-assembling, i.e. reconstructing, the original file. This stirring may for example be performed after a predefined number of hops between nodes or a predefined time interval. Advantageously, an excess of unrelated files, e.g. a 30% excess, may be downloaded together with the files required for the re-assembling to prevent an attacker to discern the file relation by monitoring the downloading activity. The encryption and obfuscation, i.e. intermixing, may be redone and the resulting files uploaded again. Due to the re-intermixing and introduction of dud files, an attacker may not be able to identify which files belong to a given transaction and which files are actually valid.

This may further have the beneficial effect that it allows keeping the respective set of first upload files stored in the cloud storage infrastructure for a long time using the present approach based on obfuscation, encryption and constant moving of the files. Thus, avoiding the risk that the time becomes sufficiently long for the third party to break all the security measures applied by the present method. Due to the renewal of the splitting, recombination and uploading with new encryption keys, new seeds and new fragments of random noise, a third party trying to break all the security measures has to restart its efforts.

Embodiments of the present invention may comprise a computer program product for secure data storage in a cloud storage infrastructure, the computer program product comprising a computer readable storage medium having program instructions embodied therewith, the program instructions executable by a processor to cause the processor to execute any of the above described embodiments of the method according to the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products According to embodiments, of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
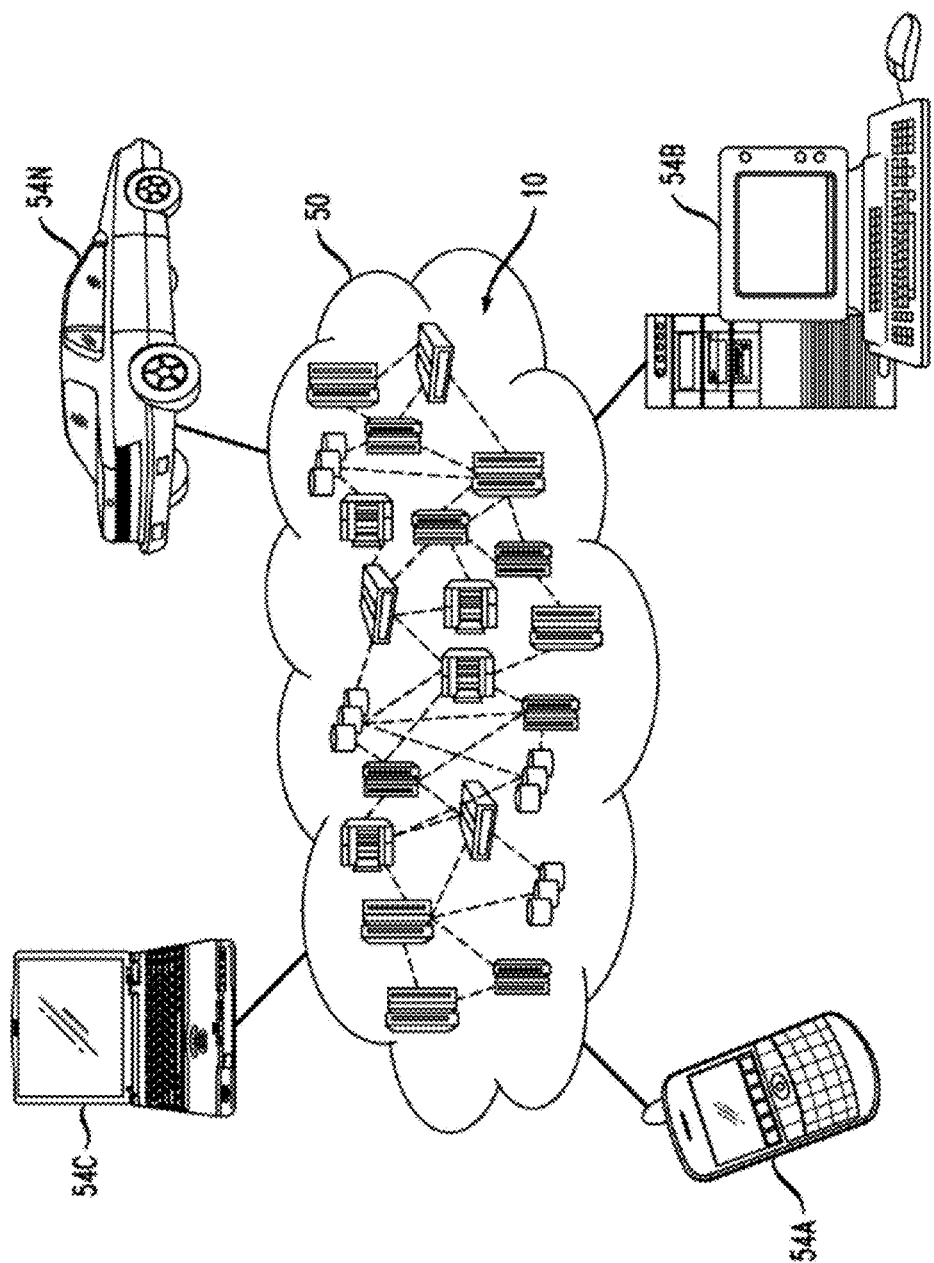
FIG. 2 depicts a schematic diagram illustrating an exemplary cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
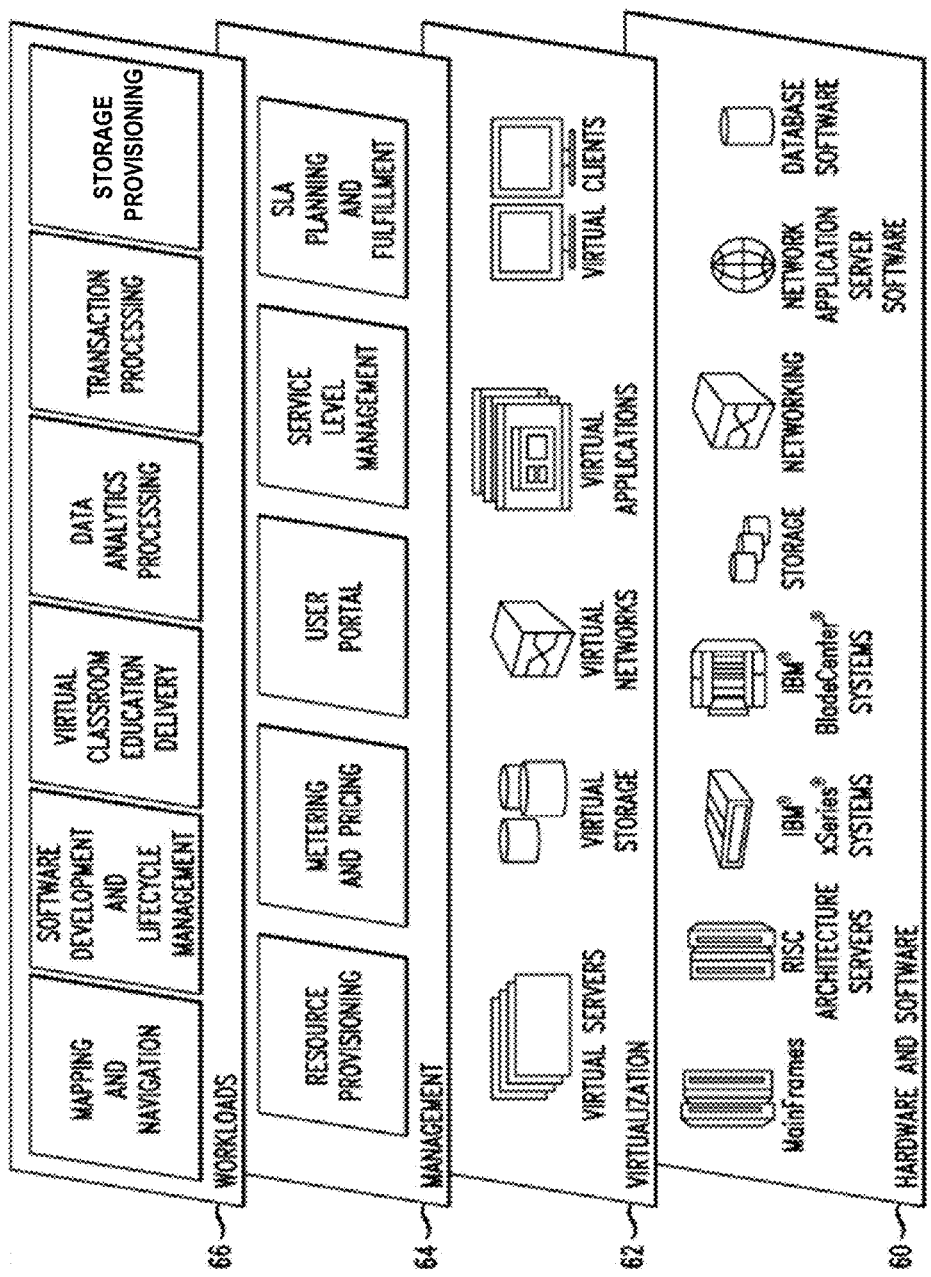
FIG. 3 depicts schematic diagram illustrating exemplary abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. For example cloud storage locations, e.g. a virtual storage of virtualization layer 62, may be provided. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. For example, the identity of a user trying to access storage locations provided by the cloud infrastructure may be verified. User portal provides access to the cloud computing environment for consumers and system administrators, e.g. access to storage locations provided by the cloud infrastructure. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and storage provisioning, e.g. of the virtual storage of virtualization layer 62, including capacity management, storage accession, monitoring and reporting.

Figure 4:
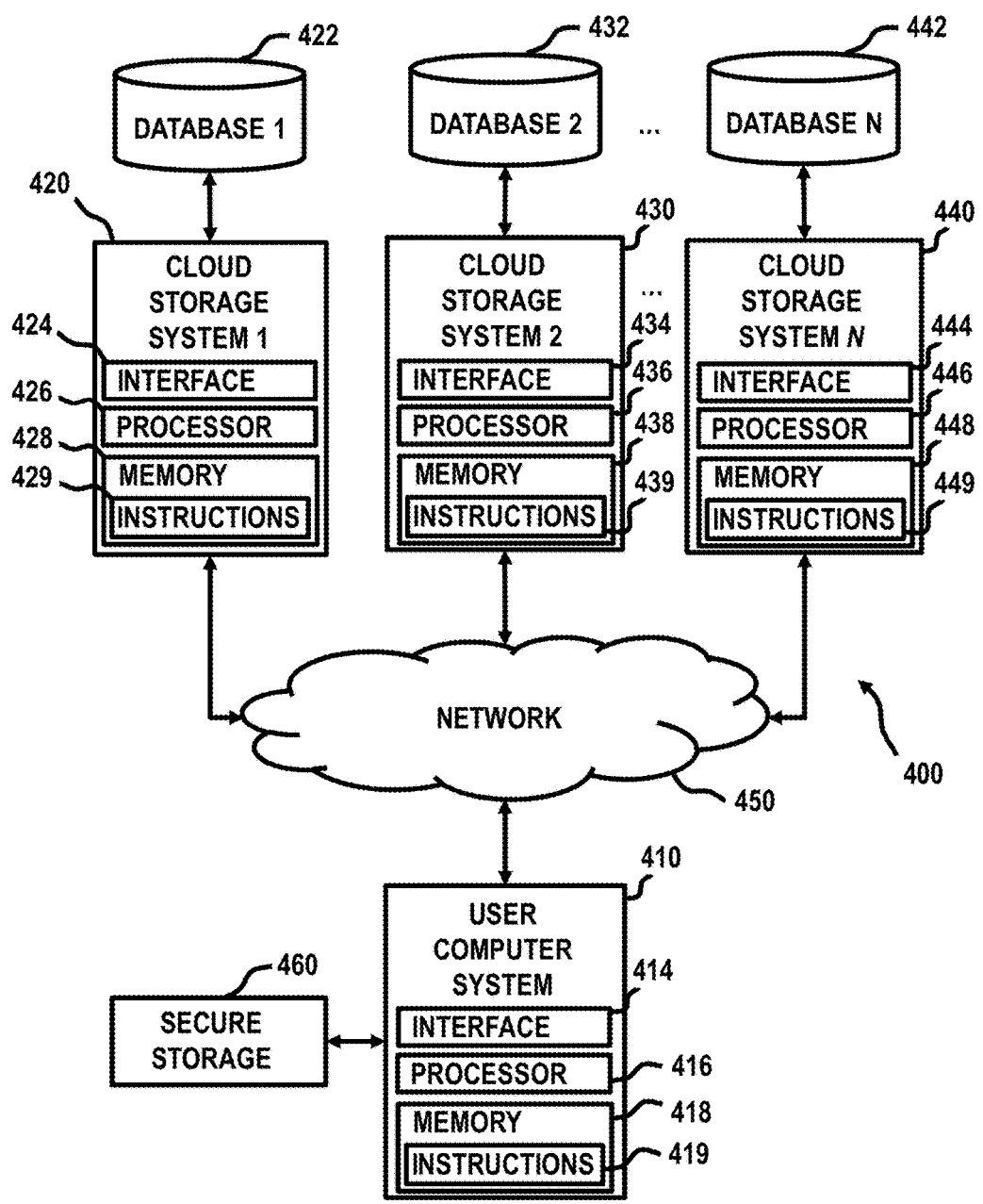
FIG. 4 depicts a first schematic diagram illustrating an exemplary cloud storage infrastructure according to an embodiment.

FIG. 4 shows a schematic diagram of an exemplary arrangement of computer systems providing a cloud storage infrastructure 400 which may be used for executing the method for secure data storage. The cloud storage infrastructure 400 may comprise a plurality of cloud storage systems exemplary represented by the cloud storage systems 420, 430 and 440 in FIG. 4. Each of the cloud storage systems is connected and/or comprises a database 422, 432, 442 for storing files which are provided by a user computer system 410 via a network 450 to the cloud storage infrastructure 400. Each cloud storage system 420, 430, 440 may comprise an interface 424, 434, 444 for communication with the user computer system 410 via the network 450. Each cloud storage system 420, 430, 440 may further comprise a processor 426, 436, 446 for executing machine-executable instructions 429, 439, 449 stored in the memory 428, 438, 448. Execution of the machine-executable instructions 429, 439, 449 may cause the processor 426, 436, 446 to control the cloud storage system 420, 430, 440 to receive uploaded files from the user computer system 410 and to store the same in the database 422, 432, 442, or to provide requested files to the user computer system 410 by reading the requested file from the database 422, 432, 442.

The user computer system 410 may comprise an interface 414 communicating with the cloud storage systems 420, 430, 440 via the network 450. The user computer system 410 may further comprise a processor 416 and a memory 418 comprising machine-executable instructions 419. Execution of the machine-executable instructions 419 by the processor 416 may cause the processor 416 to execute the present method for secure data storage in the cloud storage infrastructure 400 comprising a plurality of cloud storage locations provided by the databases 422, 432, 442.

Figure 5:
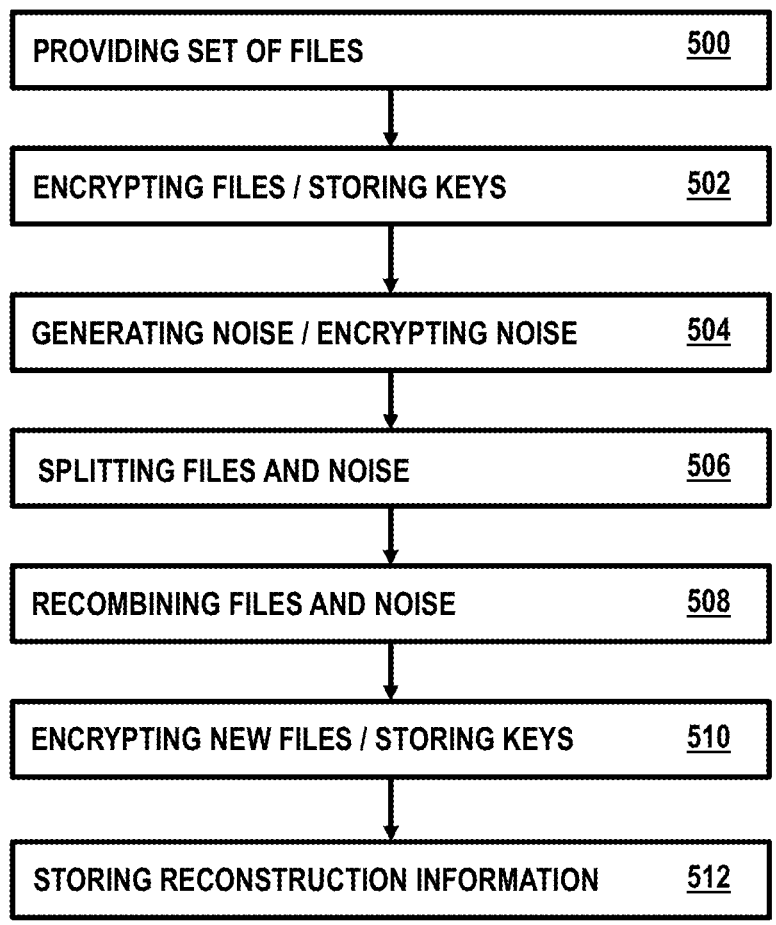
FIG. 5 depicts a first schematic flow diagram of an exemplary method for intermixing files to be uploaded into a cloud storage infrastructure according to an embodiment.

FIG. 5 depicts a schematic flow diagram of a method for generating a set of second upload files to be uploaded by obfuscating and encrypting a set of first upload files. In block 500 a set of first upload files is provided. In block 502 the provided set of first upload files is encrypted and the respective encryption keys are stored in a secure storage location. In block 504 a set of first random noise files is generated, each noise file being encrypted using an encryption key. In block 506 the first upload files and set of first random noise files are each split into a group of fragments. In block 508 the fragments are recombined by randomly intermixing fragments from different groups. The respective intermixing results in a set of second upload files, each file comprising fragments from different first upload files and at least one random noise fragment. The resulting files are additionally encrypted using encryption keys which are stored in the secure storage location in block 510. In block 512 reconstruction information about the generation of the set of second upload files is stored in the secure storage location, wherein the reconstruction information is sufficient for reconstructing the set of first upload files from the set of second upload files.

Figure 6:
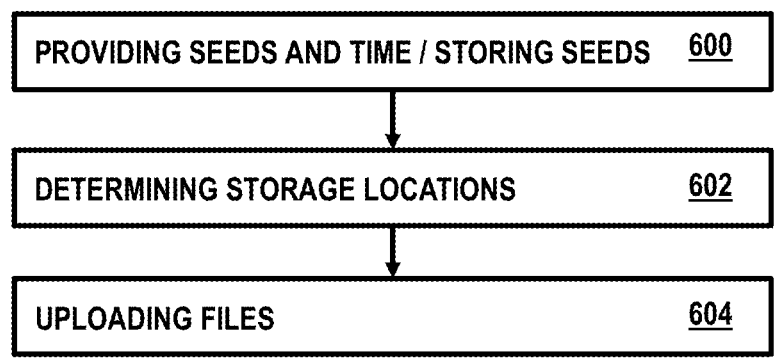
FIG. 6 depicts a schematic flow diagram of an exemplary method for uploading files into a cloud storage infrastructure according to an embodiment.

FIG. 6 depicts a schematic flow diagram of an uploading method for uploading the files created according to the method depicted in FIG. 5. In block 600 a seed is provided to a pre-seed randomizer for each of the files to be uploaded in combination with an upload time at which the respective file is to be uploaded. Each of the provided first seeds being assigned to one of the respective files to be uploaded. The first seeds used for determining temporary storage locations of the files to be uploaded are stored in the secure storage location. In block 602 the seeds are applied to a pre-seed randomizer together with the time and information about available storage locations. The pre-seed randomizer determines a temporary cloud storage location for each file to be uploaded. In block 604 the respective files are uploaded to the determined temporary storage locations.

Figure 7:
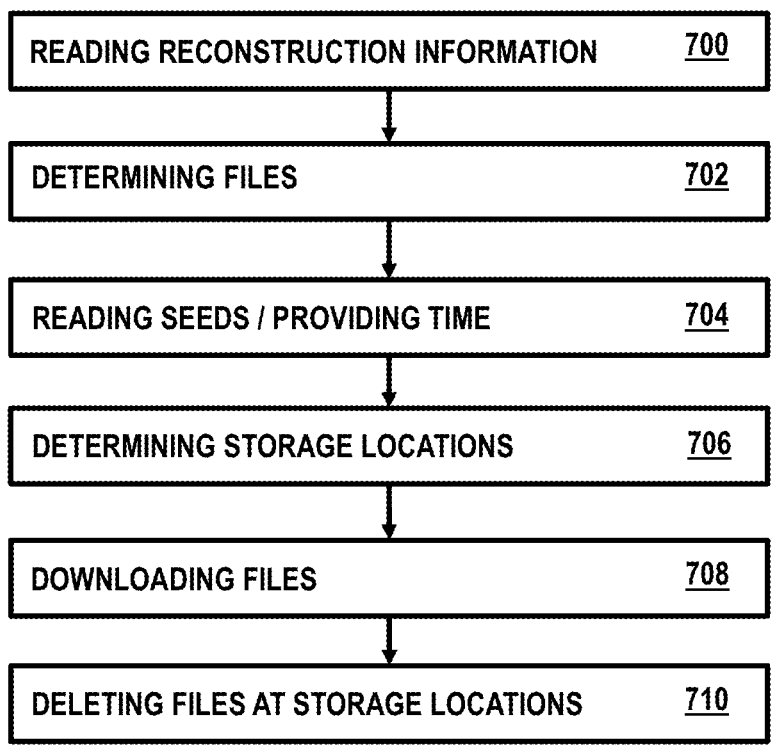
FIG. 7 depicts a schematic flow diagram of an exemplary method for downloading files into a cloud storage infrastructure according to an embodiment.

FIG. 7 depicts a schematic flow diagram of a download method for downloading files from the temporary cloud storage locations. In block 700 the reconstruction information necessary for the reconstruction of the set of first upload files is read from its secure storage location. In block 702 the files stored in the cloud storage infrastructure necessary for reconstructing the set of first upload files are determined using the reconstruction information. In block 704 the first seeds are read from their secure storage locations and the latest upload time is provided. The seeds and time from block 704 are used in block 706 to determine temporary cloud storage locations of the files determined in block 702. For determining the temporary storage locations the pre-seed randomizer is used. In block 708 the files determined in block 702 are downloaded from the storage locations determined in block 706. In block 710 the downloaded files are deleted from the temporary cloud storage locations after the download of the respective files has been finished.

Figure 8:
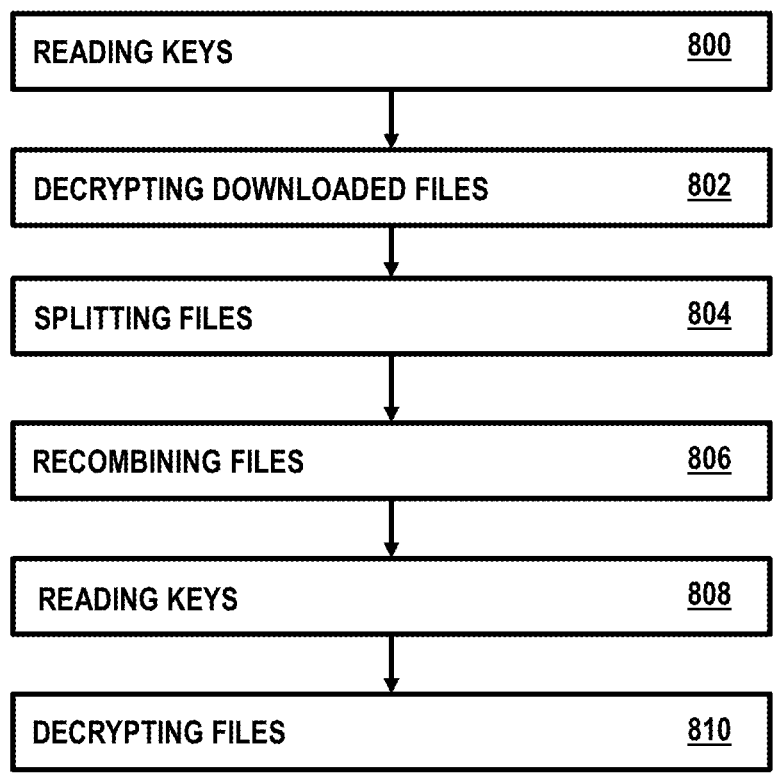
FIG. 8 depicts a schematic flow diagram of an exemplary method for recombining original files from downloaded files according to an embodiment.

FIG. 8 depicts a schematic flow diagram of a method for reconstructing first upload files using the files downloaded according to the method depicted in FIG. 7. In block 800 the encryption keys are read from their storage locations in order to use the respective keys in block 802 for decrypting the downloaded files. In block 804 the decrypted files are split into the underlying fragments of the set of first upload files. In step 806 the fragments of the set of first upload files are recombined such that the respective first upload files are rebuilt. The information required for correctly splitting and recombining the downloaded files, which has been used in block 804 and 806 to split and recombine the files, is provided by the reconstruction information already read from its storage location in block 700 of FIG. 7 for the download of the files. The random noise fragments which are additionally comprised by the downloaded files are identified and neglected using the reconstructing information. In block 808 the encryption keys for decrypting the files reconstructed in block 806 are read from the storage location. In block 810 the reconstructed files are decrypted using the respective encryption keys from block 808.

Figure 9:
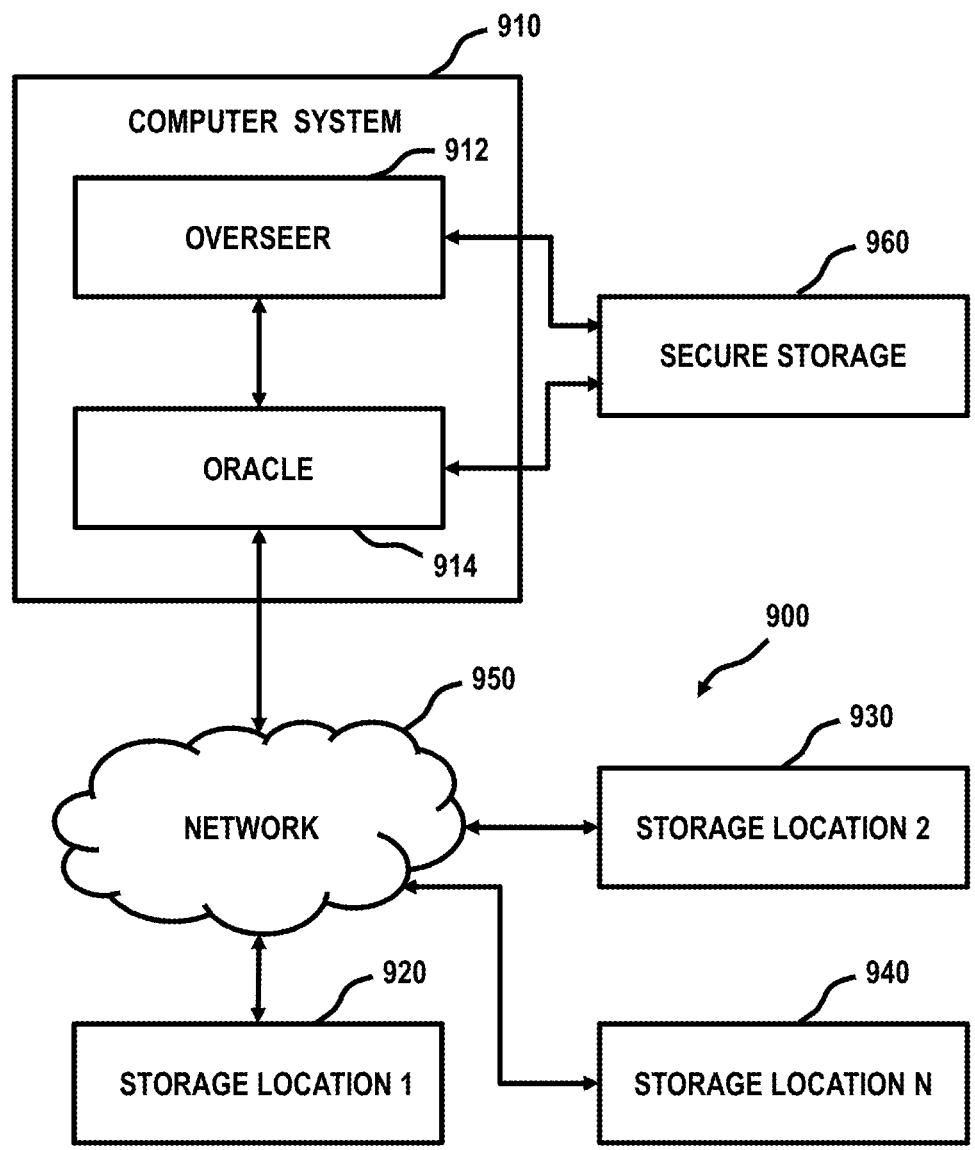
FIG. 9 depicts a second schematic diagram illustrating an exemplary cloud storage infrastructure according to an embodiment.

FIG. 9 shows a schematic diagram of a second exemplary arrangement of computer systems providing a cloud storage infrastructure 900. The computer systems of FIG. 9 may be used for executing the method for a secured storage in the cloud storage infrastructure 900. In FIG. 9, a cloud storage infrastructure 900 comprises a plurality of cloud storage locations 920, 930, 940 is shown. The computer system 910 is connected with the cloud storage infrastructure 900 via the network 950. The computer system 910 comprises an overseer module 912 and an oracle module 914. The overseer module 912 and the oracle module 914 may be comprised by one unit of the computer system 910 or by two different units of the computer system 910 independent and separated from each other. Both modules 912 and 914 may be connected with one or more secure storage devices 960. The secure storage devices 960 may be part of the computer system 910 or may be provided as an external storage device. The overseer module 912 may be configured to generate the set of second upload files upon being provided with a set of first upload files according to the method of FIG. 7 and vice versa according to the method of FIG. 8. The oracle module 914 comprises the pre-seed randomizer and may be configured for performing the upload and download methods according to FIGS. 6 and 7 as well as a moving of uploaded files.

The 'overseer' module 912 may handle all operations that involve the initial obfuscation of files by intermixing as well as the regular shifting of locations. The overseer module 912 may be responsible for generating the encryption keys as well as the primary seed to handle obfuscated filing and file movement across the available storage locations 940, 950, 960. It may also be used to decrypt/deobfuscate files requested by an authorized user.

The overseer module 912 may make use of the 'oracle' module 914 to determine the current and/or future location of a given obfuscated file. This collaboration between modules 912 and 914 is used, when the files are first placed on the distributed storage locations 940, 950, 960. The overseer module 912 may feed the oracle module 914 the primary seed and request a number of storage locations suitable to host the to-be-updated obfuscated files. It may then proceed to upload the respective files to the reported locations 940, 950, 960.

This collaboration is also used, when uploaded files are moved at intervals specified by the primary seed. The overseer module 912 may feed the oracle module 914 the primary seed and request the current location of the files (location at the latest upload time T-1). It may then, as with the initial uploading, request the target location for new upload time T. At the time of relocation the original time T, i.e. latest upload time, has expired and become T-1 indicating the current locations of the files with the new upload time T indicating the to-be-locations of the files. The overseer module 912 may delete/overwrite obfuscated files from T-1 once they have moved safely at T.

When retrieving files for an authorized user the overseer module 912 feeds the oracle module 914 the primary seed and request the files at location of upload time T. If the file cannot be found at the location and current cycle has just begun the overseer module 912 may also check at location T-1 as the file might still be in transfer.

The 'oracle' module 914 is used to locate files based on a provided seed, time and storage locations. Queries to the oracle module 912 may indicate the number of valid storage locations to retrieve as well as a separate number of invalid, random storage locations to provide. This differentiation may be used to generate 'dud' file upload/transfers to confuse an outside observer.

If the oracle module 914 is queried with a non-existent file, invalid location or invalid seed, it may generate an obfuscated file of random noise data and return this as the result of the call. This is to avoid allowing an attacker posing as an authorized user to scan for potentially valid storage locations by misusing the oracle.

The present storage location function concept may for example comprise the following inputs and outputs:
Inputs:
array of current storage locations (stable);
seed (e.g. 128 bit key);
time indicator (e.g. unixtime);
number of valid storage locations required;
number of dud storage locations required.
Outputs:
return code (success/failure);
array of valid suitable storage locations for specified time;
array of dud storage locations for specified time.

Figure 10:
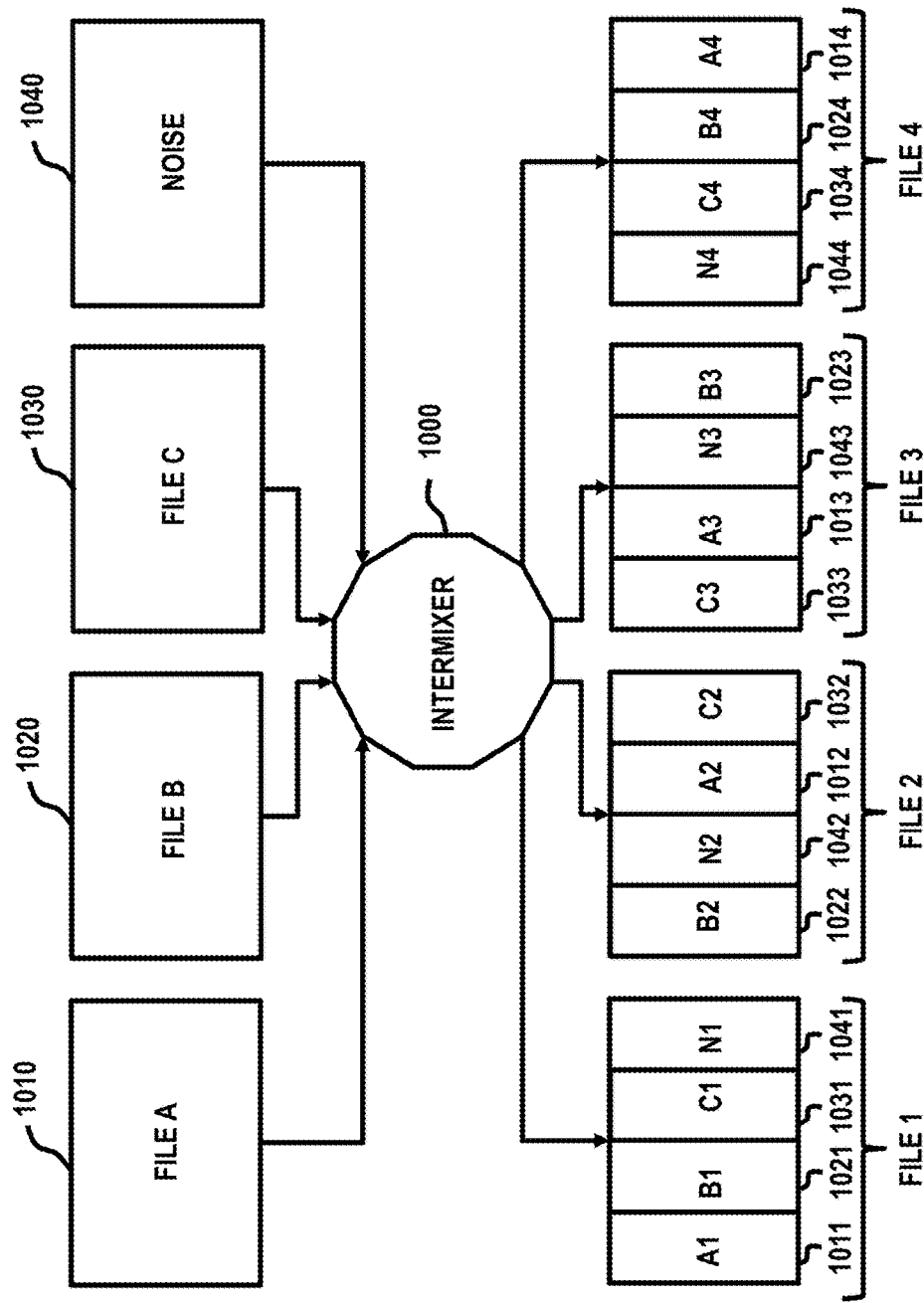
FIG. 10 depicts a second schematic flow diagram of an exemplary method for intermixing files to be uploaded into a cloud storage infrastructure according to an embodiment.

FIG. 10 depicts a schematic flow diagram illustrating the creation of a set of second upload files comprising the files 'FILE 1', 'FILE 2', 'FILE 3', and 'FILE 4'. A set of first upload files is provided comprising file A 1010, file B 1020, and file C 1030. The set of first upload files is provided to an intermixer 1000 together with a random noise file 1040. In the example of FIG. 10, each of the four files 1010, 1020, 1030, 1040 provided to the intermixer 1000 is split by the intermixer into four fragments. File A is split into fragments A1 1011, A2 1012, A3 1013 and A4 1014. File B 1020 is split into fragments B1 1021, B2 1022, B3 1023, B4 1024. File C 1030 is split into fragments C1 1031, C2 1032, C3 1033, C4 1034. The noise file 1040 is split into fragments N1 1041, N2 1042, N3 1043, N4 1044. The intermixer randomly recombines the fragments building for the output files FILE 1, FILE 2, FILE 3, FILE 4, each file comprising a fragment from each of the input files 1010, 1020, 1030, 1040. The different fragments are combined in different orders: FILE 1 comprises the fragments A1 1011 from file A 1010, fragment B1 1021 from file B 1020, file C1 1031 from file C 1030 and N1 1041 from noise file 1040. FILE 2 comprises fragment B2 1022 from file B 1020, fragment N2 1042 from random noise file 1040, fragment A2 1012 from file A 1010, fragment C2 1032 from file C 1030. FILE 3 comprises fragment C3 1033 from file C 1030, fragment A3 1013 from file A 1010, fragment N3 1043 from random noise file 1040, and fragment B3 1023 from file B 1020. Finally FILE 4 comprises fragment N4 1044 from random noise file 1040, fragment C4 1034 from file C 1030, fragment B4 1024 from file B 1020, and fragment A4 1014 from file A 1010. Please note that the order of the fragments of the output files is independent of the order of the input files, but the order has rather been randomly altered for each of the output files by the intermixer 1000. Depending on the random distribution applied by the intermixer 1000, FILE 1 may not (only) comprise the first fragments of each of the input files 1010, 1020, 1030, 1040, but fragments from other positions of the respective files.

An 'intermixes' as used herein is a software and/or hardware based module configured for intermixing files. The intermixer 1000 may comprise a pre-seed randomizer. When being provided with a seed and a set of files, the pre-seed randomizer of the intermixer 1000 determines a splitting and recombination function for the input set of files. The intermixer 1000 according to the splitting function splits each of the files received as input into a group of fragments. The fragments of the set of groups of fragments are recombined according to the recombination function such that a new set of files is created. In an embodiment, each of the recombined file may comprise a fragment from each group of fragments. Being provided with the same input, i.e. the same seed and the same set of files, the intermixer 1000 may always provide the same output. The intermixer 1000 may further be configured to provide the original input set of files as an output, when being provided with the original seed and the corresponding output set of files. Thus, the intermixer 1000 may be used to intermix a given set of files providing an intermixed set of files as an output and to regain the original input set of files from the intermixed output set of files.

Figure 11:
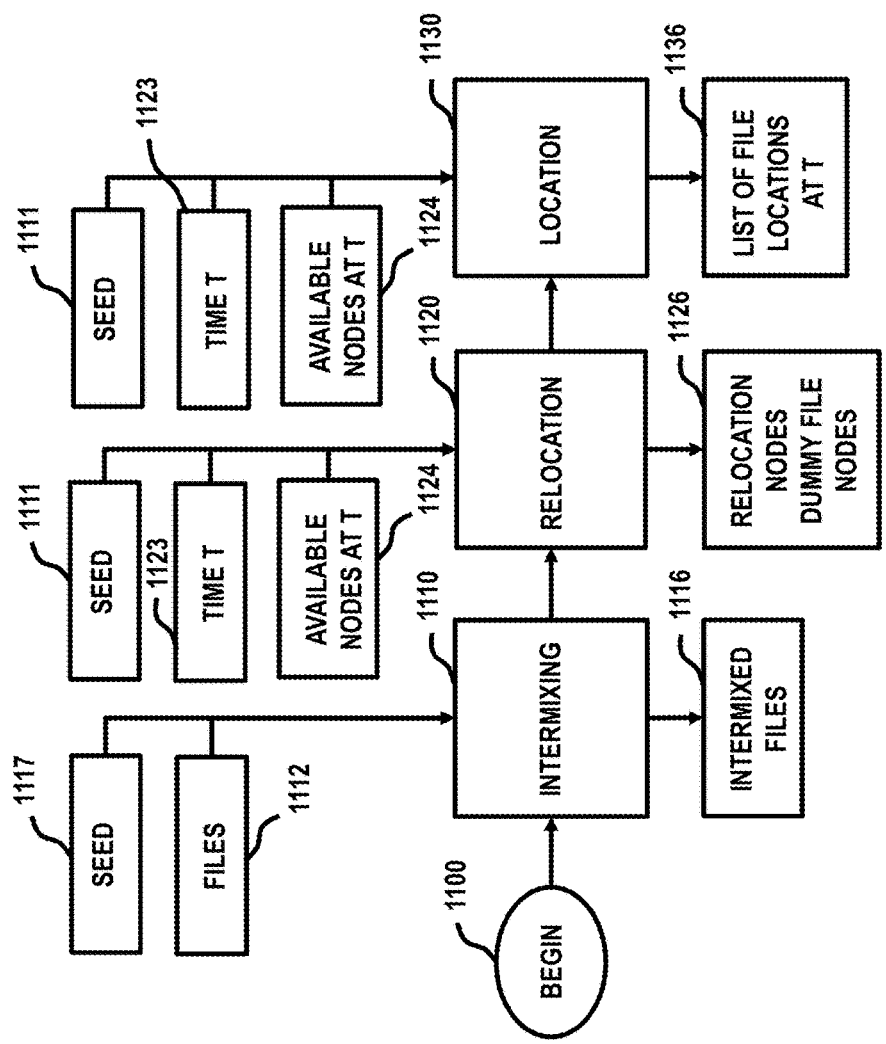
FIG. 11 depicts a schematic flow diagram of an exemplary method for secure data storage in a cloud storage infrastructure according to an embodiment.

FIG. 11 is a schematic flow diagram of a method for secure data storage in a cloud storage infrastructure. In block 1100 the method begins. In block 1110 the method of FIGS. 5 and 6 is performed. Files 1112 to be uploaded are provided, encrypted, split, recombined and again encrypted. The intermixing may be performed by an intermixer comprising a second pre-seed randomizer which is provided with a unique seed 1117. The resulting files are uploaded according to the upload distribution provided by the pre-seed randomizer which may be provided with a unique seed 1111 and an upload time 1123. The seeds 1111 and 1117 may for example be MD5 file hashes generated with the MD5 search digest algorithm. The MD5 message digest algorithm is a cryptographic hash function producing a 128 bit hash value typically expressed in text format as 32 digit hexadecimal number. The intermixing 1110 outputs the mixed files 1116 which are uploaded to the determined temporary storage locations. In block 1120 the uploaded files are moved from current temporary cloud storage locations to new temporary cloud storage locations. The new temporary cloud storage location of each uploaded file is determined using the following input: a unique seed value 1111 assigned to the respective file, a new upload time T 1123, which may for example be given by the current time, and a summary of all available cloud storage locations, i.e. a summary of all nodes provided by the cloud storage infrastructure for uploading files at time T. The output of the relocation 1120 is a summary of the relocation nodes of the cloud storage network, i.e. a summary of the new temporary cloud storage locations to which the uploaded files are moved by downloading and uploading the same. The temporary cloud storage location of each uploaded file from which the respective uploaded file is to be downloaded may be determine by using the unique seed value 1111 and the latest upload time, i.e. the time of the last upload. Furthermore, nodes for uploading dud files in order to upload more files than actual necessary for reconstruction are identified in order to obfuscate the files containing actual information. Furthermore, dud file cloud storage locations may be identified, which contain dud files which have exceeded a predefined time limit and are to be deleted in order to prevent an overloading of the cloud storage infrastructure with dud files.

In block 1130 file locations for downloading uploaded files for reconstruction purposes are identified by using the unique seed 1111, the upload time T 1123 and a summary of the available cloud storage infrastructure nodes at time T 1124 as input. As an output 1136 a list of file locations of the files to be downloaded at time T is provided. The files to be downloaded may be downloaded and used for reconstruction purposes according to the method depicted in FIGS. 7 and 8.

Figure 12:
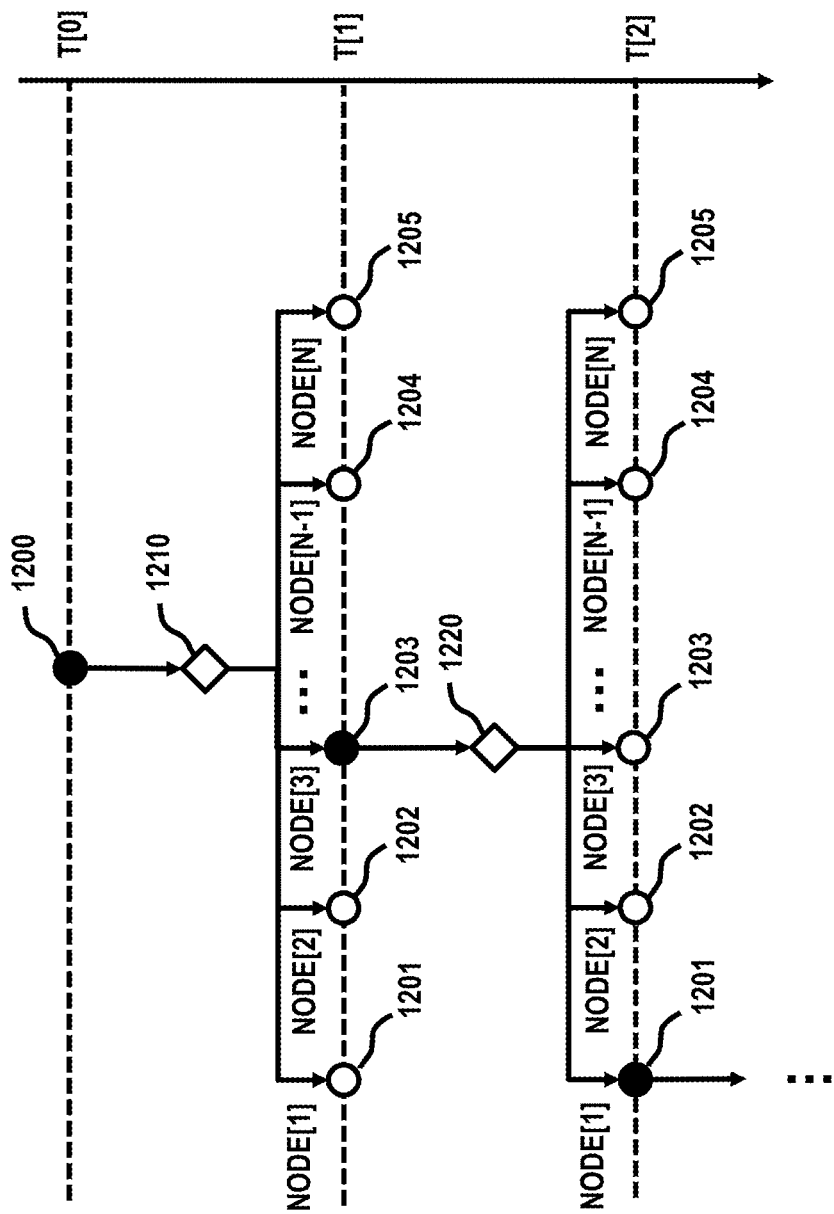
FIG. 12 depicts a schematic flow diagram of an exemplary method for uploading and moving files to be stored in a cloud storage infrastructure according to an embodiment.

FIG. 12 depicts a schematic flow diagram of the uploading and moving of files. At time T[0] the files to be uploaded are located at a user computer system 1200. According to the present method the files to be uploaded are obfuscated and encrypted. At decision point 1210, it is decided by the pre-seed randomizer to which node of the set of nodes NODE[1] 1201, NODE[2] 1202, NODE[3] 1203, NODE [N-1] 1204, and NODE[N] 1205 of cloud storage infrastructure each file resulting from the present method is to be uploaded. In the example shown in FIG. 12 the pre-seed randomizer determines NODE[3] 1203 to be the temporary cloud storage location at which a certain file is to be located at time T[1]. Therefore the respective file is uploaded to the respective node at time T[1]. At decision point 1220 it is decided to which new cloud storage location the file is to be moved at time T[2]. It is determined at which node the respective file has been located at the previous time interval T[1]. Furthermore, it is determined to which node the respective file is to be moved at new upload time T[2]. The respective file is downloaded from NODE[3] 1203 to the user computer system and uploaded to NODE[1] 1201 which has been determined to be the new temporary cloud storage location for the respective file at time T[2]. The moving is repeatedly performed at predefined time intervals as long as the respective file is to be stored in the cloud storage infrastructure.

Each movement may be restricted to a subset of available nodes and file sets, thus prevent an attacker from gaining knowledge of a given set's content by looking which files are moved/requested at the same time. In case an attacker would collect all files moved/requested at the same time, he still may not be able to identify which files belong to which transaction.

What is claimed is:
1. A method comprising:
providing a set of first upload files to be stored in a cloud storage infrastructure;
providing a set of first random noise files;
splitting each file of the set of first upload files and the set of first random noise files into a group of fragments;
recombining the fragments by randomly intermixing fragments from different groups to provide a set of second upload files, wherein each second upload file comprises fragments from different files of the two sets;
encrypting each second upload file with a first encryption key and storing each first encryption key in a secure storage location;
storing reconstruction information about the set of first upload files, the splitting, the recombining and the first encryption keys in the secure storage location, wherein the reconstruction information is sufficient to reconstruct the first upload files from the set of second upload files using the first encryption keys;
uploading each second upload file to a respective temporary cloud storage location, the respective temporary cloud storage location for each second upload file being determined from a plurality of available cloud storage locations according to a first upload distribution; and repeatedly moving each uploaded second upload file to a new temporary cloud storage location in selected intervals of time in order to store each second upload file in each determined cloud storage location only for a limited period of time.

2. The method of claim 1, further comprising:

providing the first upload distribution by a pre-seed randomizer, wherein the pre-seed randomizer uses a first seed assigned to the respective second upload file and an upload time for randomly determining the respective temporary cloud storage location of the respective second upload file according to the first upload distribution; and storing the first seed in the secure storage location.

3. The method of claim 2, further comprising moving each uploaded second upload file by:

downloading the respective file from its respective temporary cloud storage location, the respective temporary cloud storage location being identified using the pre-seed randomizer, the first seed assigned to the respective file and a latest upload time of the respective file, and performing a new upload of the respective file to a new temporary cloud storage location, the new temporary cloud storage location being determined using the pre-seed randomizer, the first seed assigned to the respective file and a new upload time for the new upload of the respective file.

4. The method of claim 3, further comprising:

responsive to downloading a second upload file from its temporary cloud storage location, sending a delete command triggering a deletion of the respective file from the respective temporary cloud storage location.

5. The method of claim 1, wherein the set of first upload files corresponds to a result of encrypting a set of upload files, each file of the set of upload files is encrypted with a second encryption key which is stored in the secure storage location, and the set of first random noise files corresponds to the result of encrypting a set of random noise files, and each file of the set of random noise files is encrypted with a second encryption key which is stored in the secure storage location.

6. The method of claim 1, wherein the first upload files and the first random noise files are split and recombined such that the resulting second upload files have equal sizes.

7. The method of claim 1, wherein the first upload files and the first random noise files are split and recombined such that the resulting second upload files have random sizes.

8. The method of claim 1, wherein the secure storage location in which the first encryption keys and reconstruction information are stored is configured as a distributed storage structure with storage segments distributed on different storage systems, each storage system having access authentication requirements which are independent of the access authentication requirements of other storage systems.

9. The method of claim 1, further comprising using different selected intervals of time for different second upload files.

10. The method of claim 1, further comprising varying the length of the selected intervals over time.

11. The method of claim 1, further comprising:

determining the temporary cloud storage locations from a plurality of available cloud storage locations provided by different computer systems, wherein each computer system has access authentication requirements which are independent of the access authentication requirements of other computer systems.

12. The method of claim 1, further comprising adding additional files to the set of second upload files.

13. The method of claim 12, wherein adding additional files to the set of second upload files comprises:

providing a set of second random noise files;

splitting first upload files and the second random noise files into groups of fragments;

recombining the fragments by randomly intermixing fragments from different groups thus generating the additional files, wherein each additional file comprises a unique combination of fragments with fragments from different files of the first upload files and second random noise files;

encrypting the additional files with first encryption keys and storing the first encryption keys in the secure storage location; and storing reconstruction information about the first upload files, the splitting, the recombination and the first encryption keys in the secure storage location, wherein the reconstruction information is sufficient to reconstruct the first upload files from the additional files using the first encryption keys.

14. The method of claim 12, wherein the additional files comprise dud files comprising only random noise.

15. The method of claim 14, further comprising sending a delete command triggering a deletion of a dud file from a temporary cloud storage location when the storage time of the dud file at the temporary cloud storage location exceeds a predefined threshold.

16. A computer system comprising:

one or more computer processors;

one or more computer-readable storage media;

program instructions stored on the computer-readable storage media for execution by at least one of the one or more processors, the program instructions comprising instructions to:

provide a set of first upload files to be stored in the cloud storage infrastructure;

provide a set of first random noise files;

split each file of the two sets into a group of fragments;

recombine the fragments by randomly intermixing fragments from different groups thus generating a set of second upload files, each second upload file comprising fragments from different files of the two sets;

encrypt each second upload file with a first encryption key and storing each first encryption key in a secure storage location;

store reconstruction information about the set of first upload files, the splitting, the recombining and the first encryption keys in the secure storage location, the reconstruction information being sufficient to reconstruct the first upload files from the set of second upload files using the first encryption keys;

upload each second upload file to a respective temporary cloud storage location, the respective temporary cloud storage location for each second upload file being determined from a plurality of available cloud storage locations according to a first upload distribution; and repeatedly move each uploaded second upload file to a new temporary cloud storage location in selected intervals of time in order to store each second upload file in each determined cloud storage location only for a limited period of time.

* * * * *